United States Patent
Yiu et al.

(10) Patent No.: US 9,847,823 B2
(45) Date of Patent: Dec. 19, 2017

(54) SYSTEMS AND METHODS FOR MOBILITY STATE ESTIMATION FRAMEWORK FOR LTE NETWORK

(71) Applicant: INTEL IP CORPORATION, Santa Clara, CA (US)

(72) Inventors: Candy Yiu, Portland, OR (US); Daniel Aley, Portland, OR (US); Mo-Han Fong, Sunnyvale, CA (US); Yujian Zhang, Beijing (CN)

(73) Assignee: INTEL IP CORPORATION, Santa Clara, CA (US)

( * ) Notice: Subject to any disclaimer, the term of this patent is extended or adjusted under 35 U.S.C. 154(b) by 107 days.

(21) Appl. No.: 14/902,292

(22) PCT Filed: Aug. 7, 2014

(86) PCT No.: PCT/US2014/050101
§ 371 (c)(1),
(2) Date: Dec. 30, 2015

(87) PCT Pub. No.: WO2015/021250
PCT Pub. Date: Feb. 12, 2015

(65) Prior Publication Data
US 2016/0373994 A1    Dec. 22, 2016

Related U.S. Application Data

(60) Provisional application No. 61/863,902, filed on Aug. 8, 2013.

(51) Int. Cl.
*H04W 36/00* (2009.01)
*H04B 7/06* (2006.01)
(Continued)

(52) U.S. Cl.
CPC ....... *H04B 7/0626* (2013.01); *E04G 23/0218* (2013.01); *E04H 9/025* (2013.01);
(Continued)

(58) Field of Classification Search
CPC ............... H04W 4/023; H04W 64/006; H04W 56/0005; H04W 72/0446; H04W 4/005;
(Continued)

(56) References Cited

U.S. PATENT DOCUMENTS 9,337,988 B2 * 5/2016 Jung ...................... H04W 36/32
9,549,352 B2 * 1/2017 Hwang ................... H04W 8/08
(Continued)

FOREIGN PATENT DOCUMENTS

EP          2566220 A1      3/2013
JP   KR 20120126033 A1 * 11/2012    .............. H04W 8/08
(Continued)

OTHER PUBLICATIONS

Ericsson, et al., "Mobility Estimation Mechanism in Heterogeneous Networks", R2-131337, 3GPP TSG-RAN WG2 Meeting #81bis, Chicago, Illinois, USA, Agenda Item 7.1.1, Apr. 15-19, 2013, 5 pages.
(Continued)

*Primary Examiner* — Meless Zewdu
(74) *Attorney, Agent, or Firm* — Stoel Rives LLP (57) ABSTRACT

Methods, systems, and devices for mobility state estimation in a heterogeneous network are disclosed herein. User equipment (UE) includes circuitry to perform a mobility state estimation (MSE) operation to determine an MSE state for the UE, and a receiver to receive, from a cell in a heterogeneous third generation partnership project (3GPP) network, mobility state information corresponding to movement of the UE within the heterogeneous 3GPP network. The circuitry is configured to update the MSE state based on
(Continued)

the mobility state information received from the cell. The UE may also include a transmitter to communicate the updated MSE state to the cell.

19 Claims, 6 Drawing Sheets

(51) Int. Cl.
| | |
|---|---|
| H04L 5/14 | (2006.01) |
| H04W 56/00 | (2009.01) |
| H04W 4/00 | (2009.01) |
| H04W 52/02 | (2009.01) |
| H04W 76/04 | (2009.01) |
| H04W 36/08 | (2009.01) |
| H04W 72/08 | (2009.01) |
| H04W 76/02 | (2009.01) |
| H04W 36/28 | (2009.01) |
| H04L 5/00 | (2006.01) |
| H04W 24/10 | (2009.01) |
| H04L 1/18 | (2006.01) |
| E04G 23/02 | (2006.01) |
| E04H 9/02 | (2006.01) |
| H04W 16/26 | (2009.01) |
| H04W 24/02 | (2009.01) |
| H04W 48/16 | (2009.01) |
| H04W 8/02 | (2009.01) |
| H04W 36/32 | (2009.01) |
| H04W 64/00 | (2009.01) |
| H04W 72/04 | (2009.01) |
| H04W 4/02 | (2009.01) |
| H04W 36/14 | (2009.01) |
| H04L 27/26 | (2006.01) |
| H04W 88/08 | (2009.01) |
| H04W 48/12 | (2009.01) |
| H04W 74/08 | (2009.01) |
| H04W 88/04 | (2009.01) |

(52) U.S. Cl.
CPC ......... *H04B 7/0617* (2013.01); *H04B 7/0639* (2013.01); *H04L 1/1812* (2013.01); *H04L 5/0048* (2013.01); *H04L 5/0058* (2013.01); *H04L 5/14* (2013.01); *H04W 4/005* (2013.01); *H04W 8/02* (2013.01); *H04W 16/26* (2013.01); *H04W 24/02* (2013.01); *H04W 24/10* (2013.01); *H04W 36/08* (2013.01); *H04W 36/28* (2013.01); *H04W 36/32* (2013.01); *H04W 48/16* (2013.01); *H04W 52/0206* (2013.01); *H04W 52/0209* (2013.01); *H04W 52/0219* (2013.01); *H04W 56/0005* (2013.01); *H04W 64/006* (2013.01); *H04W 72/082* (2013.01); *H04W 76/02* (2013.01); *H04W 76/023* (2013.01); *H04W 76/046* (2013.01); *H04L 5/0053* (2013.01); *H04L 5/1469* (2013.01); *H04L 27/2602* (2013.01); *H04W 4/023* (2013.01); *H04W 36/14* (2013.01); *H04W 48/12* (2013.01); *H04W 72/0406* (2013.01); *H04W 72/0446* (2013.01); *H04W 74/0833* (2013.01); *H04W 88/04* (2013.01); *H04W 88/08* (2013.01); *Y02B 60/50* (2013.01)

(58) Field of Classification Search
CPC .......... H04W 52/0209; H04W 76/046; H04W 36/08; H04W 52/0206; H04W 72/082; H04W 72/0406; H04W 76/023; H04W 76/02; H04W 16/26; H04W 52/0219; H04W 24/02; H04W 36/14; H04W 36/28; H04W 24/10; H04W 88/08; H04W 88/04; H04W 8/02; H04W 36/32; H04W 48/12; H04W 48/16; H04W 8/08; H04W 64/00; H04W 28/0226; H04L 5/14; H04L 5/0048; H04L 5/0053; H04L 5/1469; H04L 1/1812; H04L 5/0058; H04L 27/2602; E04G 23/0218; E04H 9/025; Y02B 60/50; H04B 7/0617; H04B 7/0626; H04B 7/0639
See application file for complete search history.

(56) References Cited

U.S. PATENT DOCUMENTS

| | | | | |
|---|---|---|---|---|
| 2004/0053626 | A1* | 3/2004 | Yagi | H04W 36/32 455/456.1 |
| 2008/0233945 | A1* | 9/2008 | Gummadi | H04W 52/282 455/422.1 |
| 2008/0233958 | A1* | 9/2008 | Robbins | H04W 36/0094 455/436 |
| 2009/0141690 | A1* | 6/2009 | Fan | H04L 1/0026 370/335 |
| 2010/0298001 | A1* | 11/2010 | Dimou | H04W 64/006 455/441 |
| 2011/0143745 | A1* | 6/2011 | Wang | H04W 64/006 455/422.1 |
| 2012/0108252 | A1 | 5/2012 | Dimou et al. | |
| 2013/0040692 | A1* | 2/2013 | Chen | H04W 36/04 455/525 |
| 2014/0228032 | A1 | 8/2014 | Jung et al. | |
| 2015/0038151 | A1* | 2/2015 | Dalsgaard | H04W 36/0083 455/444 |
| 2015/0087313 | A1* | 3/2015 | Kim | H04W 8/02 455/437 |
| 2015/0208303 | A1* | 7/2015 | Jung | H04W 8/08 455/436 |
| 2015/0223050 | A1* | 8/2015 | Yiu | H04W 52/0225 455/434 |
| 2016/0183314 | A1* | 6/2016 | Tsuboi | H04W 24/10 455/450 |

FOREIGN PATENT DOCUMENTS

| | | | | |
|---|---|---|---|---|
| WO | 2012138124 | A2 | 10/2012 | |
| WO | WO 2012/138124 | A2 * | 10/2012 | ............ H04W 36/08 |
| WO | 2013055071 | A2 | 4/2013 | |
| WO | 2013066120 | A1 | 5/2013 | |
| WO | 2013107049 | A1 | 7/2013 | |

OTHER PUBLICATIONS

PCT/US2014/050101, International Search Report and Written Opinion, dated Nov. 27, 2014, 11 pages.

* cited by examiner

SYSTEMS AND METHODS FOR MOBILITY STATE ESTIMATION FRAMEWORK FOR LTE NETWORK

RELATED APPLICATION

This application claims the benefit under 35 U.S.C. §119 (e) of U.S. Provisional Application No. 61/863,902, filed Aug. 8, 2013, which is hereby incorporated by reference herein in its entirety.

TECHNICAL FIELD

The present disclosure relates to mobility state estimation in wireless networks, and more particularly relates to mobility state estimation in a heterogeneous network.

DETAILED DESCRIPTION OF PREFERRED EMBODIMENTS

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

In third generation partnership project (3GPP) long term evolution (LTE) heterogeneous network deployment, where the small cells (e.g., pico cells, femto cells, and/or relays) with different cell sizes are overlaid by macro cells, one of the challenges is to accurately estimate a mobility state of a user equipment (UE). As discussed below, a UE's mobility state may be used to avoid frequent handover between cells and may be used to enhance other features. Generally, a UE estimates its mobility state using cell counts within a selected period of time. The UE may receive, from the network, an indication of the selected period of time and count thresholds used to determine the UE mobility states (i.e., low, medium, or high).

For example, a UE-based mobility state estimation (MSE) method may include receiving system information broadcast from a serving cell including a first time period T_CRmax specifying a duration for evaluating an allowed number of cell reselection(s), a second time period T_CRmaxHyst specifying an additional duration before the UE can enter normal-mobility (or low-mobility) state, a first threshold value N_CR_M specifying a maximum number of cell reselections to enter a medium-mobility state, and a second threshold value N_CR_H specifying a maximum number of cell reselections to enter high-mobility state. If the number of cell reselections during the first time period T_CRmax exceeds N_CR_M and does not exceed N_CR_H, then the UE determines that it is in a medium-mobility state. If the number of cell reselections during the first time period T_CRmax exceeds N_CR_H, then the UE determines that it is in a high mobility state. In certain embodiments, the UE does not count consecutive reselections between the same two cells into mobility state detection criteria if the same cell is reselected just after one other reselection. If the criteria for either the medium-mobility state or the high-mobility state are not detected during the second time period T_CRmaxHyst, then the UE determines that it is in a normal-mobility (or low-mobility) state.

The above UE-based MSE method works reasonably well when it is used in a homogenous network where all the cell sizes are the same. At a cell edge or in heterogeneous networks with different cell sizes, however, the above UE-based MSE method may fail to accurately estimate the UE's mobility state due to low-power conditions and errors caused be cell count. UE-based MSE may be somewhat improved by, for example, weighting based on cell size, cell type, handover (HO) type, or Doppler based on channel conditions. Alternatively, network-based MSE may be used in certain situations. In network-based MSE, a serving cell may collect handover history information from neighboring cells (e.g., through an X2 interface), which the serving cell uses to determine the UE's mobility state. However, transitions between idle mode and connected mode may cause some handover information to not be available to the serving cell, which may result in MSE errors. Therefore, the network may request the UE to send cell history information upon idle to connected mode. In this case, the network can better estimate the UE mobility state. Network-based MSE, however, introduces delay and cannot perform estimation within a cell.

Thus, embodiments disclosed herein provide a framework for mobility state estimation as a solution in LTE. In certain such embodiments, information from network-based MSE methods is combined with UE-based MSE methods to achieve better performance and more accurate results. The framework allows freedom of the implementation of the UE-based MSE, which takes into account the network-based MSE when it is available. In certain situations, pure network-based MSE introduces delay to the UE and increases signaling for some enhancements, while pure UE-based MSE may be inaccurate. Thus, the disclosed embodiments bound the error and minimize the delay for some enhancements using mobility state information of the UE.

A brief review of a wireless network is provided for clarity. Wireless mobile communication technology uses various standards and protocols to transmit data between a node (e.g., a transmission station or a transceiver node) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include LTE Rel. 8, 9 and 10, the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11-2012 standard, which is commonly known to industry groups as WiFi.

In a 3GPP radio access network (RAN) LTE system, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicate with the wireless device, known as a user equipment (UE). The downlink (DL) transmission may be a communication from the node (e.g., eNB) to the wireless device (e.g., UE), and the uplink (UL) transmission may be a communication from the wireless device to the node.

In homogeneous networks, the node, also called a macro node, may provide basic wireless coverage to wireless devices in a cell. The cell may be the area in which the wireless devices are operable to communicate with the macro node. Heterogeneous networks may be used to handle the increased traffic loads on the macro nodes due to increased usage and functionality of wireless devices. Heterogeneous networks may include a layer of planned high power macro nodes (macro-eNBs or macro cells) overlaid with layers of lower power nodes (small cells, small-eNBs, micro-eNBs, pico-eNBs, femto-eNBs, or home eNBs [HeNBs]) that may be deployed in a less well planned or even entirely uncoordinated manner within the coverage area (cell) of a macro node. The lower power nodes (LPNs) may generally be referred to as "low power nodes," small nodes, or small cells.

The macro node may be used for basic coverage. The low power nodes may be used to fill coverage holes within a macro node's geographic coverage area (i.e., cell) and at the boundaries between the macro nodes' coverage areas. Low power nodes may also be used to improve capacity in high use areas and improve indoor coverage where building structures impede signal transmission.

Heterogeneous networks may use time-division duplexing (TDD) or frequency-division duplexing (FDD) for DL or UL transmissions. TDD is an application of time-division multiplexing (TDM) to separate downlink and uplink signals. In TDD, downlink signals and uplink signals may be carried on a same carrier frequency where the downlink signals use a different time interval from the uplink signals, so the downlink signals and the uplink signals do not generate interference for each other. TDM is a type of digital multiplexing in which two or more bit streams or signals, such as a downlink or uplink, are transferred apparently simultaneously as sub-channels in one communication channel, but are physically transmitted on different resources. In FDD, an uplink transmission and a downlink transmission may operate using different frequency carriers. In FDD, interference may be avoided because the downlink signals use a different frequency carrier from the uplink signals.

As used herein, the terms "node" and "cell" are both intended to be synonymous and refer to a wireless transmission point operable to communicate with multiple user equipment, such as an eNB, a low power node, or other base station.

Figure 1:
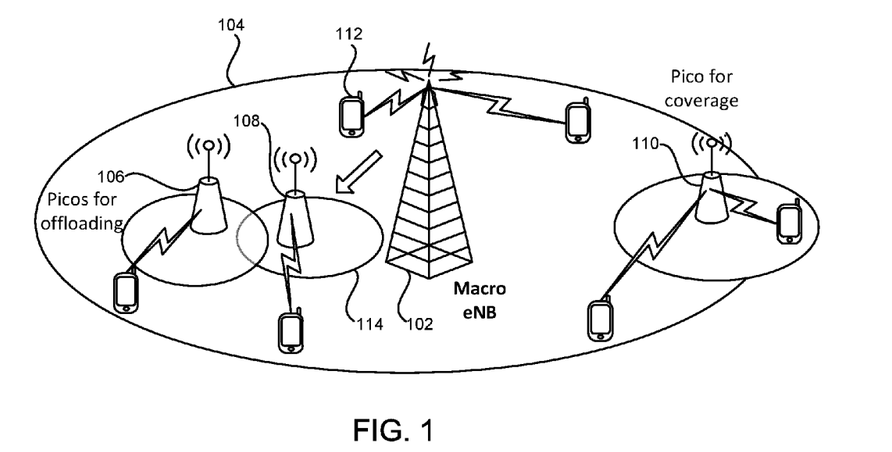
FIG. 1 illustrates a block diagram of a heterogeneous wireless network.

A potentially large number of low power nodes, such as pico nodes, may exist within the geographic region covered by a macro eNB. For example, FIG. 1 illustrates a macro eNB 102 that provides coverage area 104. Within this coverage area 104 are two small cells 106, 108 which may be used to improve capacity in high use areas by allowing the macro eNB to offload to the small cells 106, 108. Another small cell 110 is illustrated as existing on the edge of the coverage area 104. The small cell 110 may be used to fill coverage holes within the macro node's coverage area 104 and at the boundaries between the macro nodes' coverage area, as shown in FIG. 1.

While three small cells 106, 108, 110 are illustrated within the coverage area 104 of the macro node 102, a macro node's coverage area may include hundreds or even thousands of small nodes. For example, small nodes configured as HeNBs may be located in hundreds or thousands of homes that are within the coverage area of a single macro node. Similarly, within one RAN there may be a mixture of sparse and dense small cell deployments.

Frequent handover may occur if a user equipment (UE) is moving around relative to a large number of low power nodes located within the macro node's coverage area. Frequent handover is typically not desirable since the handover procedure, as outlined in the 3GPP LTE specifications (including Rel. 8, 9 and 10), entails a fairly large number of overhead messages, such as radio resource control (RRC) signaling messages that are communicated between the UE and the wireless network. In addition, handover may also entail additional overhead, including physical layer reconfiguration and uplink synchronization with random access when a UE enters the coverage area of a new node, such as an LPN. Thus, significant control signaling overhead may be imposed on both a RAN (such as an eNB or other node) and core network infrastructure (such as an MME or S-GW within an EPC). Reducing handover and/or handover signaling in heterogeneous networks may result in significant overhead savings for the core network or the RAN.

Figure 2:
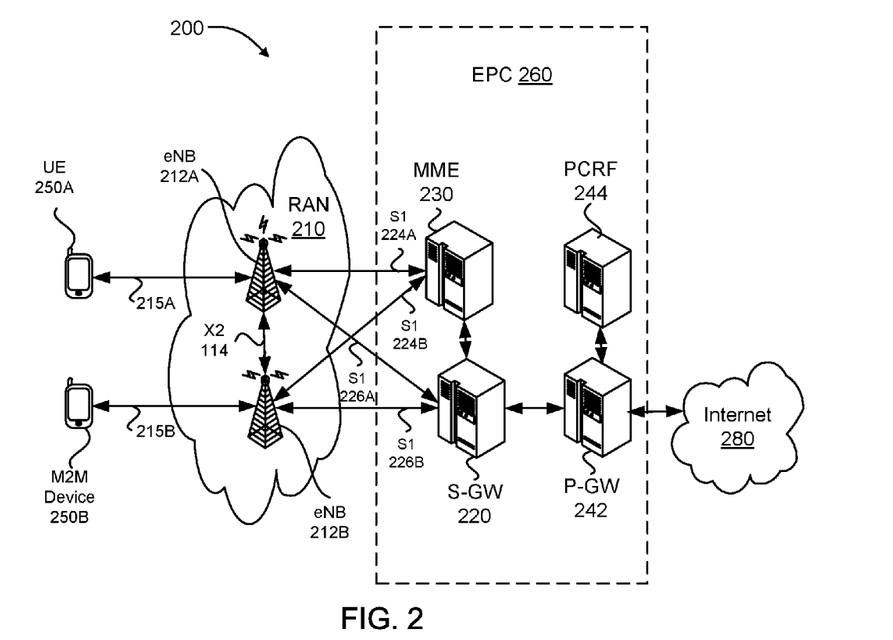
FIG. 2 illustrates a block diagram of a third generation partnership project (3GPP) wireless network.

FIG. 2 illustrates an example of a 3GPP LTE radio access network (RAN) system. The system operates based on the 3GPP LTE specification, such as releases 8, 9, 10, 11 and beyond. The wireless network 200 illustrated in FIG. 2 includes a RAN 210 and an evolved packet core (EPC) 260. For 3GPP LTE, the RAN 210 illustrated in FIG. 2 may include transmission nodes such as the evolved universal terrestrial radio access (E-UTRAN or eUTRAN) or UTRAN modules, represented as the eNBs 212A and 212B. The eNBs may include both a macro node and a plurality of low power nodes, as previously discussed.

The RAN 210 may be in communication with an evolved packet core (EPC) 260. The EPC may include a serving gateway (S-GW) 220 and a mobility management entity (MME) 230. The EPC 260 may also include a packet data network (PDN) gateway (P-GW) 242 to couple the S-GW to a PDN, such as the internet 280, an intra-net, or other network. The S-GW 220 may provide internet network access and standard network access for the mobile devices associated with the RAN 210. The S-GW 220 and MME 230 may be in direct communication with each other via cabling, wire, optical fiber, and/or transmission hardware, such as a router or repeater.

The eNBs 212A-B may be connected to one or more UEs, such as UEs 250A-B, via an LTE radio link 215A-B, respectively. A backhaul link 114, such as an X2 link, may be used to connect the eNBs 212A-B. The X2 link is typically formed over a broadband wired or optical connection between the eNBs 212A-B. Connections between the eNBs 212A-B, the S-GW 220, and the MME 230 may be made via S1 type connections 224A-B, and 226A-B. The S1 interface is described in 3GPP Technical Specification (TS) 36.410 versions 8 (Dec. 11, 2008), 9 (Dec. 10, 2009) and 10 (Mar. 23, 2011), which are available to the public.

The EPC 260 may also include a policy and charging rules function (PCRF) node 244 that may be used to determine, in near real time, policy rules in the wireless network. The PCRF node 24 may access subscriber databases and other specialized functions, such as charging systems, as may be appreciated.

In one embodiment, the macro node 102 and small cell 106, 108 may be within wireless communication range, such as a small cell used for offloading. Alternatively, the small cell 110 may be outside the range of the macro node, such as a small cell used to provide additional coverage. Whether the small cell is inside or outside the wireless communication range of the macro node, the small cell and macro node may be connected via a wired or optical connection to form an X2 interface. In addition, when the small cell is within the wireless communication range of the macro node, the small cell and macro node may communicate via an air interface, as may be appreciated.

When a UE moves from the coverage area 104 of a macro node 102 into the coverage area 114 of a small cell 108, the UE may not be able to receive a downlink signal from the macro node due to interference from a downlink signal from the small cell. In order for a UE to maintain a connection with a wireless network, the UE is typically configured to be handed over from the macro node to the small cell. This process is referred to as handover.

Figure 3:
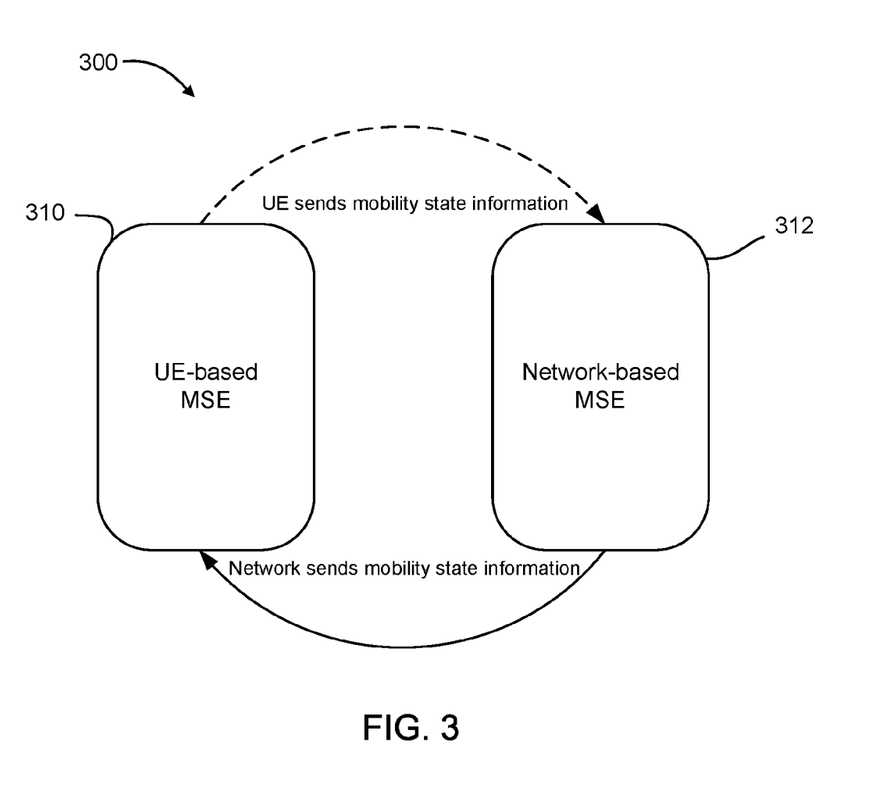
FIG. 3 is a block diagram of a mobility state estimation framework according to certain embodiments.

FIG. 3 is a block diagram of a mobility state estimation framework 300 according to certain embodiments. The mobility state estimation framework 300 provides a more accurate determination of a UE's MSE to reduce or avoid frequent handover procedures and/or to provide other enhancement based on MSE. The mobility state estimation framework 300 includes a UE-based MSE 310 and/or a network-based MSE 312. The network (e.g., the EPC 260 shown in FIG. 2) includes data associated with the deployment of cells, individual cell size, and individual cell power. The network uses this data along with handover history information associated with a UE to estimate the speed or mobility state of the UE. The network sends mobility state information to the UE, which the UE uses to enhance its UE-based MSE 310. For example, the UE can use the mobility state information from the network as an initial state of the MSE or it can be part of the UE-based MSE input information. In certain embodiments, the UE also sends mobility state information to the network, which the network may use to assist in determining the network-based MSE 312.

Figure 4:
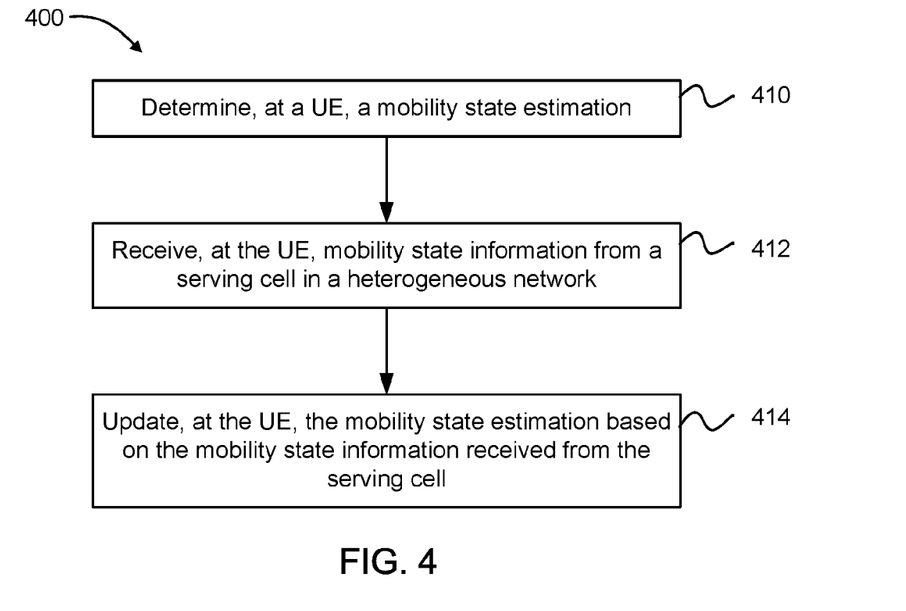
FIGS. 4, 5, 6, 7, and 8 are flow diagrams of methods for mobility state estimation according to certain embodiments.

FIG. 4 is a flow diagram of a method 400 for mobility state estimation according to one embodiment. The method 400, performed at a UE, includes determining 410 a mobility state estimation, receiving 412 mobility state information from a serving cell in a heterogeneous network, and updating 414 the mobility state estimation of the UE based on the mobility state information received from the serving cell. In this embodiment, the UE may use any of a variety of methods to determine the UE-based MSE 310 (e.g., the particular method may be determined by the UE's vendor or a new UE-based mobility estimation algorithm may be adopted in the standard), but the UE takes into account the mobility state information sent by the network to update the UE mobility state more accurately. For example, as discussed above, the UE may use the cell count to determine the mobility state. If the algorithm has accumulated any error from the cell counting method (e.g., due to low-power conditions), the UE can correct the UE-based MSE 310 using the received network-based MSE information. Thus, the UE may set an initial mobility state to the network mobility state and the UE-based MSE algorithm can reset.

Figure 5:
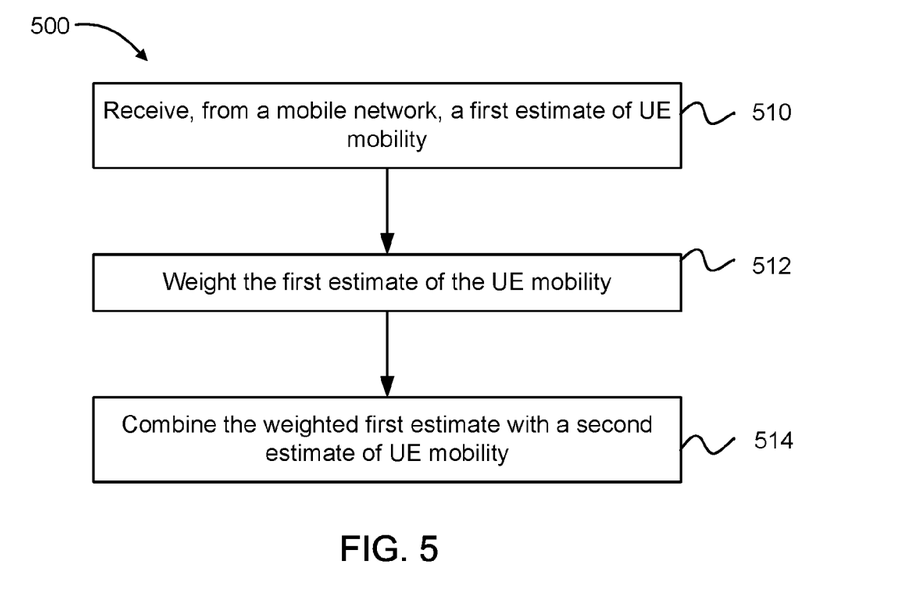

FIG. 5 is a flow diagram of a method 500 for mobility state estimation according to another embodiment. The method 500 includes receiving 510, from a mobile network, a first estimate of UE mobility (e.g., a cell count determined by the network and/or a network-based MSE state such as low, medium or high), weighting 512 the first estimate of the UE mobility, and combining 514 the weighted first estimate with a second estimate of the UE mobility (e.g., a cell count determined by the UE and/or a UE-based MSE state such as low, medium, or high). The combining 514 may include, for example, averaging the first estimate and the second estimate. Again, the UE may use any of a variety of methods to determine the second estimate. When the mobile network sends the first estimate to the UE, the UE performs a weighting method to combine the first estimate with the second estimate to determine the UE mobility state. For example, the UE may weight the network-based MSE 50% before combining it with the UE-based MSE. Or, if the mobile network's estimate is believed to be more accurate, for example, the UE may weight the network-based MSE 80% before combining it with the UE-based MSE. Skilled persons will recognize from the disclosure herein that any amount of weighting may be used, including weighting the network-based MSE at 100% or more, depending on the particular application or network parameters.

Figure 6:
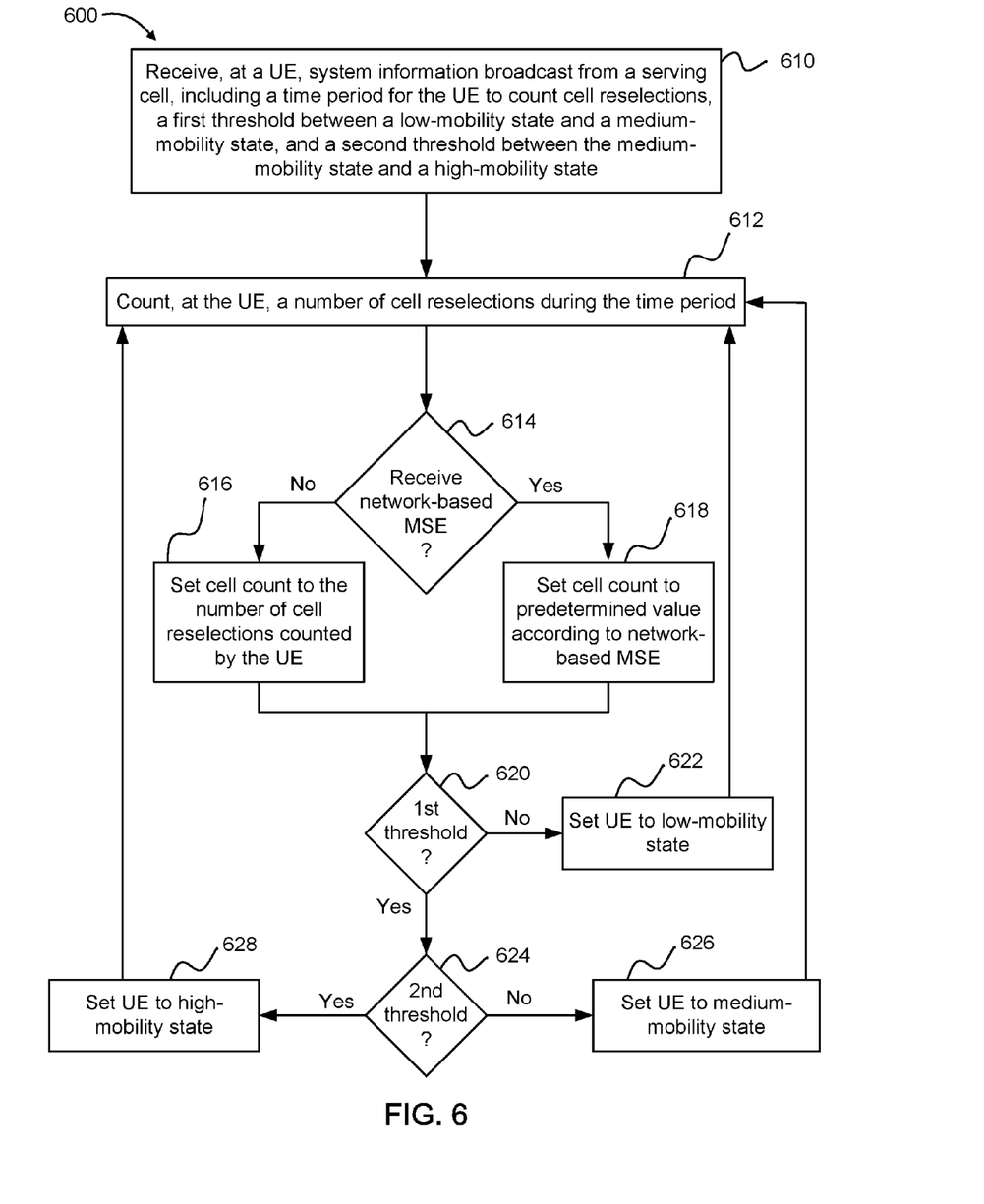

In another embodiment, the UE-based MSE 310 is based on cell counting (e.g., 3GPP LTE specification Rel. 8), as discussed above. When the network sends the UE mobility state to the UE, the UE uses it to update its mobility state by setting cell counts to pre-configured values for the specific states. For example, if the network indicates that the UE is in low-mobility state, and the range of low-mobility state is defined as 0-7 cell reselections, the cell count can be reset to 3.5. FIG. 6 is a flow diagram of a method 600 for mobility state estimation based on cell counts according to one embodiment. The method 600 includes receiving 610, at a UE, system information broadcast from a serving cell. The system information includes a time period for the UE to count cell reselections, a first threshold between a low-mobility state and a medium-mobility state, and a second threshold between the medium-mobility state and a high mobility state.

The method 600 further includes counting 612, at the UE, a number of cell reselections during the time period, and querying 614 whether a network-based MSE has been received. If a network-based MSE has not been received, the UE sets 616 the cell count to the number of cell reselections counted by the UE. If, however, a network-based MSE has been received, the UE sets 618 the cell count to a predetermined value according to the received network-based MSE. By way of example, and not by limitation, for a given time period a first range of 0-3 cell reselections may define a low-mobility state, a second range of 4-6 cell reselections may define a medium-mobility state (e.g., first threshold=4), and a third range of 7-10 cell reselections may define a high-mobility state (e.g., second threshold=7). Thus, if the received network-based MSE indicates a low-mobility state, the UE sets the cell count to a predetermined value within the first range (e.g., 1.5). Or, if the received network-based MSE indicates a medium-mobility state, the UE sets the cell count to a predetermined value within the second range (e.g., 5.0). Similarly, if the received network-based MSE indicates a high-mobility state, the UE sets the cell count to a predetermined value within the third range (e.g., 8.5).

The set cell count determines the UE's mobility state and the UE counts 612 a number of cell reselections during a next time period. In particular, the UE queries 620 whether the set cell count has reached the first threshold. If not, the method 600 includes setting 622 the UE to the low-mobility state and continuing to count 612 the number of cell reselections during the next time period. If the first threshold has been reached, the UE queries 624 whether the set cell count has reached the second threshold. The method 600 includes setting 626 the UE to the medium mobility state if the second threshold has not been reached, or setting 628 the UE to the high-mobility state if the second threshold has been reached. The UE then returns to counting 612 the number of cell reselections during the next time period. Skilled persons will recognize from the disclosure herein that many changes may be made to the method 600 shown in FIG. 6. For example, fewer mobility states or many more mobility states may be defined.

Figure 7:
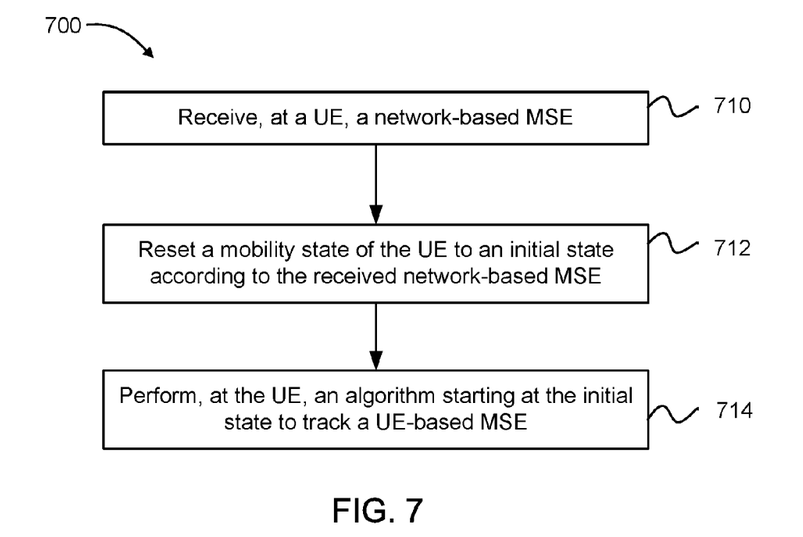

FIG. 7 is a flow diagram of a method 700 for mobility state estimation according to another embodiment. The method 700 includes receiving 710, at a UE, a network-based MSE, resetting 712 a mobility state of the UE to an initial state according to the received network-based MSE, and performing 714, at the UE, an algorithm starting at the initial state to track a UE-based MSE. In this example embodiment, the algorithm for UE-based MSE is not limited to counting cell reselections and may include any method for determining a UE mobility state. The network sends the mobility state to the UE. The UE updates its mobility state based on the network-based MSE. The UE-based MSE is reset and the network-based MSE is used as the initial state of the algorithm.

Figure 8:
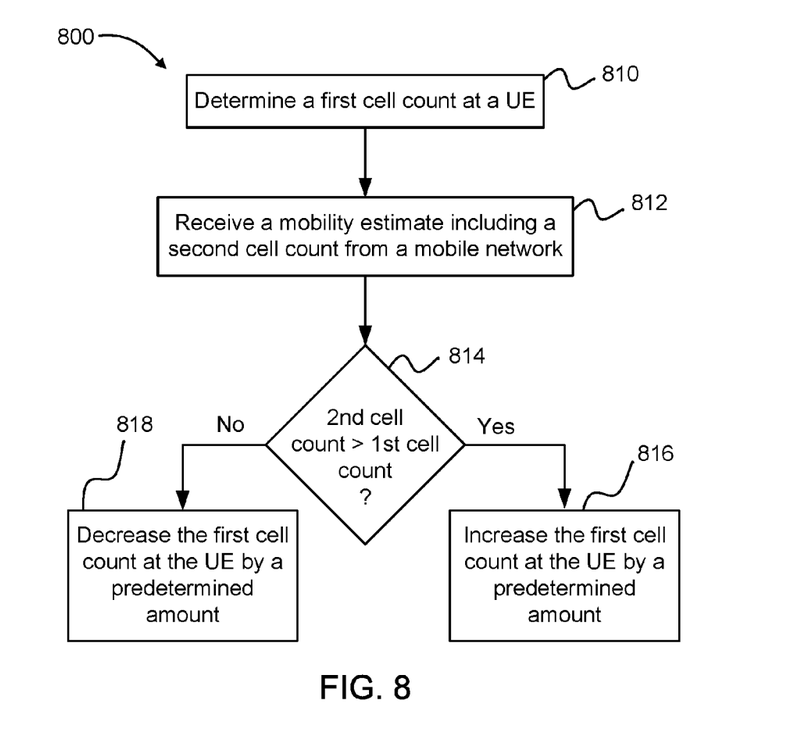

In another embodiment, the UE-based MSE is based on cell counts, as discussed above. The network sends the mobility state to the UE. If the network's estimate is higher than the UE's estimate, the cell count is increased by a predetermined amount. If, however, the network's estimate is lower than the UE's estimate, the cell count is decreased by some amount. For example, FIG. 8 is a flow diagram of a method 800 for mobility state estimation according to another embodiment. The method 800 includes determining 810 a first cell count at a UE, receiving 812 a mobility estimate including a second cell count from a mobile network, and querying 814 whether the second cell count is greater than the first cell count. If the second cell count is greater than the first cell count, the method 800 includes increasing 816 the first cell count at the UE by a predetermined amount. If the second cell count is less than the first cell count, the method 800 includes decreasing 818 the first cell count by a predetermined amount.

Figure 9:
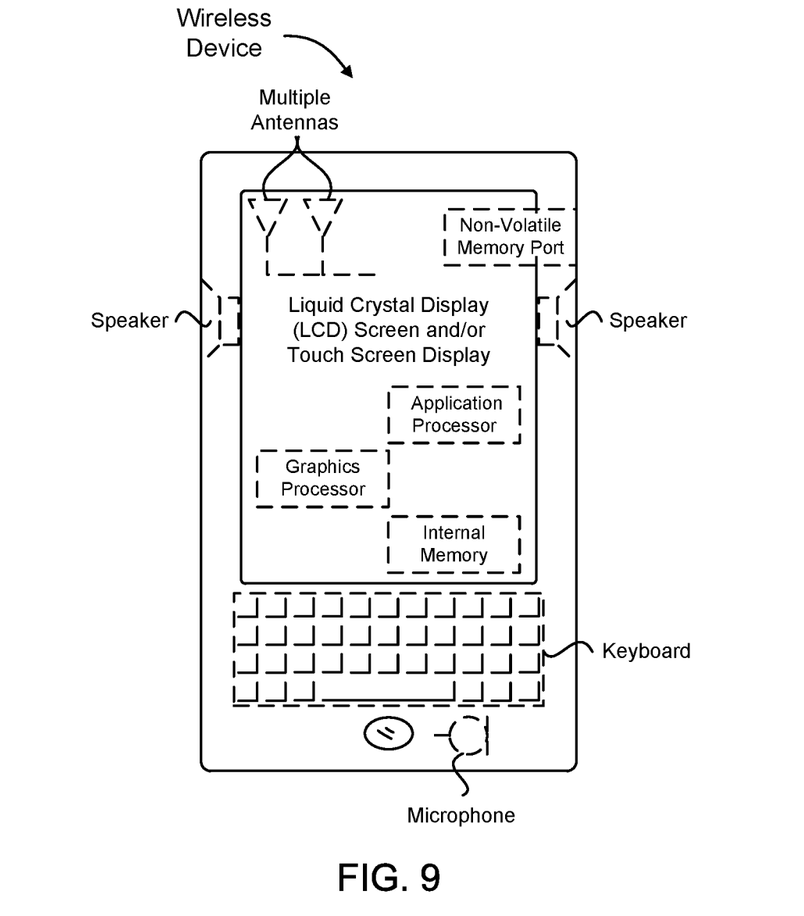
FIG. 9 is an example illustration of a mobile device according to certain embodiments.

FIG. 9 provides an example illustration of a mobile device, such as a user equipment (UE), a mobile station (MS), a mobile wireless device, a mobile communication device, a tablet, a handset, or other type of mobile wireless device. The mobile device may include one or more antennas configured to communicate with a node, macro node, low power node (LPN), or transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device may be configured to communicate using at least one wireless communication standard including 3GPP LTE, WiMAX, High Speed Packet Access (HSPA), Bluetooth, and WiFi. The mobile device may communicate using separate antennas for each wireless communication standard or shared antennas for multiple wireless communication standards. The mobile device may communicate in a wireless local area network (WLAN), a wireless personal area network (WPAN), and/or a WWAN.

FIG. 9 also provides an illustration of a microphone and one or more speakers that may be used for audio input and output from the mobile device. The display screen may be a liquid crystal display (LCD) screen, or other type of display screen such as an organic light emitting diode (OLED) display. The display screen may be configured as a touch screen. The touch screen may use capacitive, resistive, or another type of touch screen technology. An application processor and a graphics processor may be coupled to internal memory to provide processing and display capabilities. A non-volatile memory port may also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

EXAMPLES

The following examples pertain to further embodiments.

Example 1 is a UE comprising circuitry to perform an MSE operation to determine an MSE state for the UE. The UE also includes a receiver to receive, from a cell in a heterogeneous 3GPP network, mobility state information corresponding to movement of the UE within the heterogeneous 3GPP network. The circuitry to update the MSE state based on the mobility state information received from the cell. The UE further includes a transmitter to communicate the updated MSE state to the cell.

Example 2 includes the UE of Example 1, wherein the mobility state information received from the cell comprises a network-based MSE state.

Example 3 includes the UE of Example 2, wherein to update the MSE state, the circuitry is configured to initialize the MSE state of the UE to a network-based MSE state indicated by the mobility state information, and reset the MSE operation.

Example 4 includes the UE of Example 2, wherein to update the MSE state, the circuitry is configured to weight the network-based MSE state, and combine the weighted network-based MSE state with the MSE state for the UE.

Example 5 includes the UE of Example 1, wherein the MSE operation includes a first count of cell reselections determined by the UE, wherein the mobility state information received from the cell comprises a second count of cell reselections determined by the heterogeneous 3GPP network. The circuitry is further configured to weight second count based on an expected accuracy of the mobility state information received from the heterogeneous 3GPP network, and combine the weighted second count with the first count.

Example 6 includes the UE of Example 1, wherein the circuitry is further configured to perform handover operations between a plurality of cells in the heterogeneous 3GPP network, store handover information comprising a number of cell reselections performed during a time period resulting from the handover operations, perform the MSE operation based on a cell count corresponding to the number of cell reselections performed during the time period, reset the cell count to a predetermined value based on the mobility state information received from the heterogeneous 3GPP network; and update the MSE state based on the reset cell count.

Example 7 includes the UE of Example 1, wherein the circuitry is further configured to set an initial value for calculating the MSE state based on the mobility state information received from the cell, and recalculate the MSE state using the initial value.

Example 8 includes the UE of Example 1, wherein the circuitry is further configured to determine a first cell count corresponding to cell reselections within the heterogeneous 3GPP network during a predetermined period of time. The circuitry is configured to receive, from the heterogeneous 3GPP network, a second cell count. If the second cell count is greater than the first cell count, the circuitry increases the first cell count by a predetermined amount. If the second cell count is less than the first cell count, the circuitry decreases the first cell count by the predetermined amount. The circuitry is further configured to calculate the MSE state based on the increased or decreased first cell count.

Example 9 includes the UE of Example 1, further comprising multiple antennas, in which a first antenna of the multiple antennas is coupled to the transmitter, and in which a second antenna of the multiple antennas is coupled to the receiver. The UE further includes a display touchscreen, and a keyboard.

Example 10 is a method, that includes receiving, at a UE in a mobile communication network, system information broadcast from a serving cell. The system information includes a time period for the UE to count cell reselections, a first threshold between a low-mobility state and a medium-mobility state, and a second threshold between the medium-mobility state and a high-mobility state. The method includes counting, at the UE, a number of cell reselections during the time period, and setting a cell count to the number of cell reselections counted by the UE. The method also includes receiving, from the mobile communication network, mobility information corresponding to the UE, changing the cell count based on the mobility information received from the mobile communication network, and comparing the reset cell count to the first threshold and the second threshold to select a current mobility state for the UE.

Example 11 includes the method of Example 10, wherein the mobility information received from the mobile communication network comprises a network-based mobility state selected from a group comprising the low-mobility state, the medium-mobility state, and the high-mobility state.

Example 12 includes the method of Example 11, further comprising, in response to receiving the network-based mobility state, resetting the cell count to one of a plurality of predetermined values according to the network-based mobility state. The method also includes comparing the reset cell count to the first threshold and the second threshold to select the current mobility state for the UE.

Example 13 includes the method of Example 12, wherein a first value of the plurality of predetermined values is within a first range of values defined for the low-mobility state, a second value of the plurality of predetermined values is within a second range of values defined for the medium-mobility state, and a third value of the plurality of predetermined values is within a third range of values defined for the high-mobility state.

Example 14 includes the method of Example 12, further comprising adding to the reset cell count as the UE performs cell reselections during the time period to produce a next cell count, and comparing the next cell count to the first threshold and the second threshold to select a next mobility state for the UE.

Example 15 includes the method of Example 10, wherein setting the cell count to the number of cell reselections counted by the UE comprises setting a first cell count, and wherein the mobility information received from the mobile communication network comprises a second cell count determined by the mobile communication network for the UE.

Example 16 includes the method of Example 15, further comprising comparing the second cell count to the first cell count. If the second cell count is greater than the first cell count, the method includes increasing the first cell count by a predetermined amount. If the second cell count is less than the first cell count, the method includes decreasing the first cell count by the predetermined amount. The method further includes comparing the increased or decreased first cell count to the first threshold and the second threshold to select the current mobility state for the UE.

Example 17 includes the method of Example 16, further comprising adding to the increased or decreased first cell count as the UE performs cell reselections during the time period to produce a next cell count, and comparing the next cell count to the first threshold and the second threshold to select a next mobility state for the UE.

Example 18 includes the method of Example 10, further comprising communicating the current mobility state from the UE to the serving cell.

Example 19 is a UE, comprising a memory to store first mobility data determined by the UE; and a processor. The processor is configured to apply a weighting factor to second mobility data received from a wireless network to produce a weighted second mobility data, combine the first mobility data with the weighted second mobility data, and determine a mobility state of the UE based on the combined first mobility data and the weighted second mobility data.

Example 20 includes the UE of Example 19, wherein the first mobility data includes a first count of cell reselections during handover operations determined by the UE, wherein the second mobility data includes a second count of cell reselections during the handover operations determined by the wireless network, wherein the weighted second mobility data comprises a selected percentage of the second count, and wherein the processor is further configured to combine with an average of the first count and the selected percentage of the second count.

Example 21 includes the UE of Example 19, wherein the weighting factor is selected based on an expected accuracy of the second mobility data received from the wireless network.

Example 22 is a UE, comprising means for performing an MSE operation to determine an MSE state for the UE. The UE also includes means for receiving, from a cell in a heterogeneous 3GPP network, mobility state information corresponding to movement of the UE within the heterogeneous 3GPP network. The UE further includes means for updating the MSE state based on the mobility state information received from the cell, and means for communicating the updated MSE state to the cell.

Example 23 includes the UE of Example 22, wherein the mobility state information received from the cell comprises a network-based MSE state.

Example 24 includes the UE of Example 23, further comprising means for initializing the MSE state of the UE to a network-based MSE state indicated by the mobility state information, and means for resetting the MSE operation.

Example 25 includes the UE of Example 23, further comprising means for weighting the network-based MSE state, and means for combining the weighted network-based MSE state with the MSE state for the UE.

Example 26 includes the UE of Example 22, wherein the MSE operation includes a first count of cell reselections determined by the UE, wherein the mobility state information received from the cell comprises a second count of cell reselections determined by the heterogeneous 3GPP network. The UE further includes means for weighting the second count based on an expected accuracy of the mobility state information received from the heterogeneous 3GPP network, and means for combining the weighted second count with the first count.

Example 27 includes the UE of Example 22, further comprising means for performing handover operations between a plurality of cells in the heterogeneous 3GPP network, means for storing handover information comprising a number of cell reselections performed during a time period resulting from the handover operations, means for performing the MSE operation based on a cell count corresponding to the number of cell reselections performed during the time period, means for resetting the cell count to a predetermined value based on the mobility state information received from the heterogeneous 3GPP network, and means for updating the MSE state based on the reset cell count.

Example 28 includes the UE of Example 22, further comprising means for setting an initial value for calculating the MSE state based on the mobility state information received from the cell, and means for recalculating the MSE state using the initial value.

Example 29 includes the UE of Example 22, further comprising means for determining a first cell count corresponding to cell reselections within the heterogeneous 3GPP network during a predetermined period of time. The UE further includes means for receiving, from the heterogeneous 3GPP network, a second cell count. The UE also includes means for increasing, if the second cell count is greater than the first cell count, the first cell count by a predetermined amount. The UE also includes means for decreasing, if the second cell count is less than the first cell count, the first cell count by the predetermined amount. The UE further includes means for calculating the MSE state based on the increased or decreased first cell count.

Example 30 is a computer program product comprising a computer readable storage medium having a computer readable program code embodied therein, the computer readable program code adapted to be executed to implement a method comprising applying a weighting factor to second mobility data received from a wireless network to produce a weighted second mobility data, combining the first mobility data with the weighted second mobility data, and determining a mobility state of the UE based on the combined first mobility data and the weighted second mobility data.

Example 31 includes the computer program product of Example 30, wherein the first mobility data includes a first count of cell reselections during handover operations determined by the UE, wherein the second mobility data includes a second count of cell reselections during the handover operations determined by the wireless network, wherein the weighted second mobility data comprises a selected percentage of the second count, and wherein the method is further configured to combine using an average of the first count and the selected percentage of the second count.

Example 32 includes the computer program product of Example 30, wherein the weighting factor is selected based on an expected accuracy of the second mobility data received from the wireless network.

Example 33 is an apparatus comprising means to perform a method as recited in any one of Examples 10-18.

Example 34 is a machine-readable storage including machine-readable instructions, when executed, to implement a method or realize an apparatus or UE as recited in any preceding Example.

Example 35 is a machine readable medium including code, when executed, to cause a machine to perform the method of any one of Examples 10-18.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention may be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation may be made without the exercise of inventive faculty, and without departing from the principles and concepts of the invention. Accordingly, it is not intended that the invention be limited, except as by the claims set forth below.

The invention claimed is:

1. User equipment (UE), comprising:
   circuitry to perform a mobility state estimation (MSE) operation to determine an MSE state for the UE;
   a receiver to receive, from a cell in a heterogeneous third generation partnership project (3GPP) network, mobility state information corresponding to movement of the UE within the heterogeneous 3GPP network, wherein the mobility state information received from the cell comprises a network-based MSE state;
   the circuitry to update the MSE state based on the mobility state information received from the cell, wherein to update the MSE state, the circuitry is configured to initialize the MSE state of the UE to the network-based MSE state indicated by the mobility state information and reset the MSE operation; and
   a transmitter to communicate the updated MSE state to the cell;
   wherein the circuitry is further configured to:
   change a cell count based on the mobility information received from the mobile communication network; and
      compare the changed cell count to a first threshold and a second threshold to select a current mobility state for the UE, wherein the first threshold is between a low-mobility state and a medium-mobility state, and wherein the second threshold is between the medium-mobility state and a high-mobility state.

2. The UE of claim 1, wherein to update the MSE state, the circuitry is configured to:
   weight the network-based MSE state; and
   combine the weighted network-based MSE state with the MSE state for the UE.

3. The UE of claim 1, wherein the MSE operation includes a first count of cell reselections determined by the UE, wherein the mobility state information received from the cell comprises a second count of cell reselections determined by the heterogeneous 3GPP network, and wherein the circuitry is further configured to:
   weight second count based on an expected accuracy of the mobility state information received from the heterogeneous 3GPP network; and
   combine the weighted second count with the first count.

4. The UE of claim 1, wherein the circuitry is further configured to:
   perform handover operations between a plurality of cells in the heterogeneous 3GPP network;
   store handover information comprising a number of cell reselections performed during a time period resulting from the handover operations;
   perform the MSE operation based on the cell count corresponding to the number of cell reselections performed during the time period;
   reset the cell count to a predetermined value based on the mobility state information received from the heterogeneous 3GPP network; and
   update the MSE state based on the reset cell count.

5. The UE of claim 1, wherein the circuitry is further configured to:
   set an initial value for calculating the MSE state based on the mobility state information received from the cell; and
   recalculate the MSE state using the initial value.

6. The UE of claim 1, wherein the cell count comprises a first cell count, wherein the first threshold or the second threshold comprises a second cell count, and wherein the circuitry is further configured to:
   determine a first the first cell count corresponding to cell reselections within the heterogeneous 3GPP network during a predetermined period of time;
   receive, from the heterogeneous 3GPP network, the second cell count;
   if the second cell count is greater than the first cell count, increase the first cell count by a predetermined amount;
   if the second cell count is less than the first cell count, decrease the first cell count by the predetermined amount; and
      calculate the MSE state based on the increased or decreased first cell count.

7. The UE of claim 1, further comprising:
   multiple antennas, in which a first antenna of the multiple antennas is coupled to the transmitter, and in which a second antenna of the multiple antennas is coupled to the receiver;
   a display touchscreen; and
   a keyboard.

8. A method, comprising:
   receiving, at a user equipment (UE) in a mobile communication network, system information broadcast from a serving cell, the system information including a time period for the UE to count cell reselections, a first threshold between a low-mobility state and a medium-mobility state, and a second threshold between the medium-mobility state and a high-mobility state;
counting, at the UE, a number of cell reselections during the time period;
setting a cell count to the number of cell reselections counted by the UE;
receiving, from the mobile communication network, mobility information corresponding to the UE;
changing the cell count based on the mobility information received from the mobile communication network; and
comparing the reset cell count to the first threshold and the second threshold to select a current mobility state for the UE.

9. The method of claim 8, wherein the mobility information received from the mobile communication network comprises a network-based mobility state selected from a group comprising the low-mobility state, the medium-mobility state, and the high-mobility state.

10. The method of claim 9, further comprising:
in response to receiving the network-based mobility state, resetting the cell count to one of a plurality of predetermined values according to the network-based mobility state; and
comparing the reset cell count to the first threshold and the second threshold to select the current mobility state for the UE.

11. The method of claim 10, wherein a first value of the plurality of predetermined values is within a first range of values defined for the low-mobility state, a second value of the plurality of predetermined values is within a second range of values defined for the medium-mobility state, and a third value of the plurality of predetermined values is within a third range of values defined for the high-mobility state.

12. The method of claim 10, further comprising:
adding to the reset cell count as the UE performs cell reselections during the time period to produce a next cell count; and
comparing the next cell count to the first threshold and the second threshold to select a next mobility state for the UE.

13. The method of claim 8, wherein setting the cell count to the number of cell reselections counted by the UE comprises setting a first cell count, and wherein the mobility information received from the mobile communication network comprises a second cell count determined by the mobile communication network for the UE.

14. The method of claim 13, further comprising:
comparing the second cell count to the first cell count;
if the second cell count is greater than the first cell count, increasing the first cell count by a predetermined amount;
if the second cell count is less than the first cell count, decreasing the first cell count by the predetermined amount; and
comparing the increased or decreased first cell count to the first threshold and the second threshold to select the current mobility state for the UE.

15. The method of claim 14, further comprising:
adding to the increased or decreased first cell count as the UE performs cell reselections during the time period to produce a next cell count; and
comparing the next cell count to the first threshold and the second threshold to select a next mobility state for the UE.

16. The method of claim 8, further comprising communicating the current mobility state from the UE to the serving cell.

17. User equipment (UE), comprising:
a memory to store first mobility data determined by the UE; and
a processor to:
apply a weighting factor to second mobility data received from a wireless network to produce a weighted second mobility data;
combine the first mobility data with the weighted second mobility data; and
determine a mobility state of the UE based on the combined first mobility data and the weighted second mobility data.

18. The UE of claim 17, wherein the first mobility data includes a first count of cell reselections during handover operations determined by the UE, wherein the second mobility data includes a second count of cell reselections during the handover operations determined by the wireless network, wherein the weighted second mobility data comprises a selected percentage of the second count, and wherein the processor is further configured to combine an average of the first count and the selected percentage of the second count.

19. The UE of claim 17, wherein the weighting factor is selected based on an expected accuracy of the second mobility data received from the wireless network.

* * * * *